United States Patent
DeVuyst

Patent Number: 5,694,969
Date of Patent: Dec. 9, 1997

[54] PRESSURE RELIEF TIRE VALVE

[76] Inventor: Christopher DeVuyst, 2678 Dixie La., Kissimmee, Fla. 34744

[21] Appl. No.: 589,386

[22] Filed: Jan. 22, 1996

[51] Int. Cl.$^6$ ............................ F16K 15/20; B60C 29/02
[52] U.S. Cl. .................. 137/226; 137/529; 137/468; 152/427
[58] Field of Search ........................ 137/79, 224, 226, 137/529, 493.9, 468; 152/427

[56] References Cited

U.S. PATENT DOCUMENTS

| | | | |
|---|---|---|---|
| 1,246,131 | 11/1917 | Marston | 137/226 |
| 2,987,071 | 6/1961 | Haus | 137/230 |
| 3,557,826 | 1/1971 | Albrecht | 137/529 X |
| 3,830,249 | 8/1974 | Fleenor et al. | 137/224 |
| 4,015,624 | 4/1977 | Wanstreet et al. | 137/224 |
| 4,076,037 | 2/1978 | Perez | 137/230 |
| 4,151,863 | 5/1979 | Stevens et al. | 137/798 |
| 4,384,543 | 5/1983 | Wong | 116/34 R |
| 4,660,590 | 4/1987 | Sanchez | 137/226 |
| 4,883,082 | 11/1989 | Pirkle | 137/79 X |
| 4,895,199 | 1/1990 | Magnuson et al. | 152/415 |
| 5,054,511 | 10/1991 | Tuan et al. | 137/224 |
| 5,060,685 | 10/1991 | Zhabokrug | 137/230 |
| 5,275,196 | 1/1994 | Mitchell et al. | 137/224 |
| 5,365,967 | 11/1994 | Moore | 137/226 |

*Primary Examiner*—John Rivell
*Attorney, Agent, or Firm*—William M. Hobby, III

[57] ABSTRACT

A pressure relief tire valve for inflating a tire wheel assembly has a tire inflation valve body having a chamber therein with openings through the top and bottom ends thereof and having a relief opening formed in the tire valve body. An inflation valve having a spring loaded central core to allow to pass inward is located in the tire valve body adjacent the tire inflation valve body top end for inflating the tire therethrough. An overpressure valve is located in the tire valve body for releasing air from the tire when the air pressure in the tire exceeds a predetermined level. The overpressure valve has a valve seat and valve element biased against the valve element by a compression for maintaining the valve element in a closed position until the predetermined air pressure is reached in the tire and to allow the valve element to open to release air through the valve body relief opening when the air pressure in the tire and to allow the valve element to open to release air through the valve body relief opening when the air pressure in the tire exceeds the predetermined pressure. A heat variable bellows supports the compression spring and is responsive to changes in temperature of the air in the tire so that the overpressure valve can prevent overinflating the tire as well as loss of tire pressure upon an increase of air pressure in the tire from an increase in temperature of the air in the tire.

13 Claims, 1 Drawing Sheet

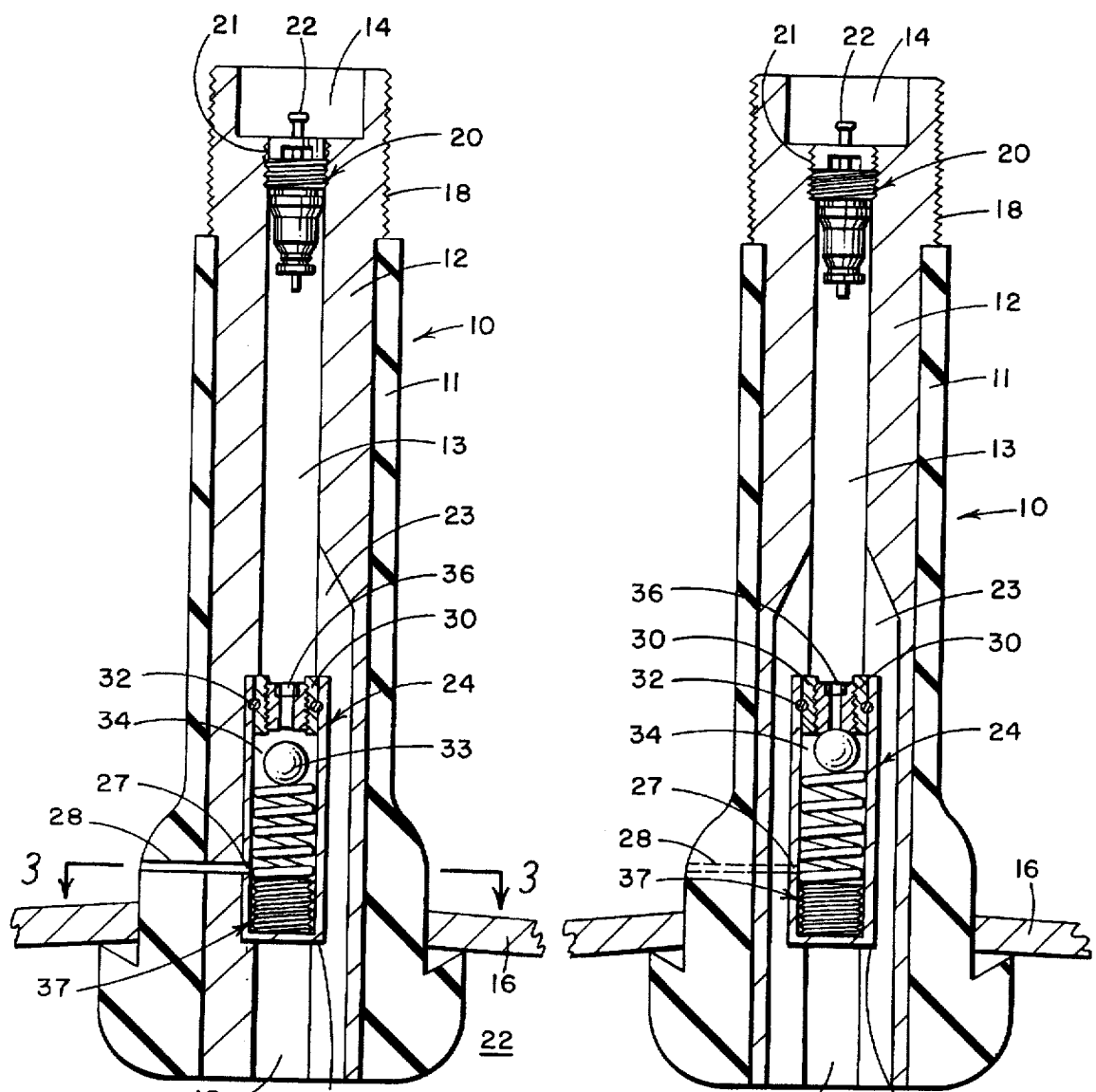
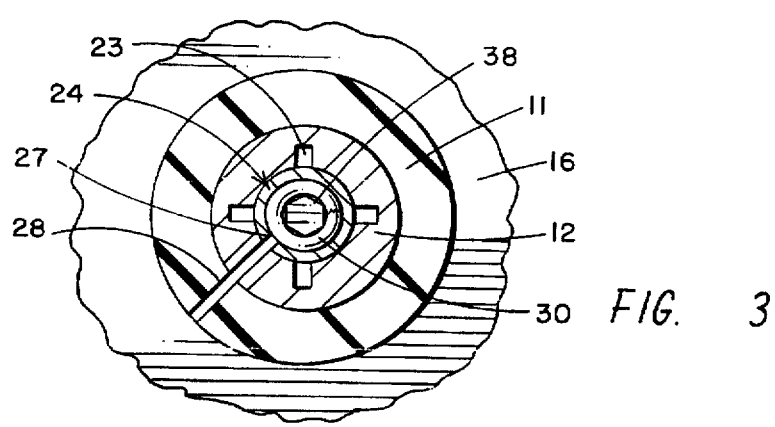

5,694,969

1

PRESSURE RELIEF TIRE VALVE

BACKGROUND OF THE INVENTION

This invention relates to a tire valve for inflating a pneumatic tire and for preventing overinflation of the tire during inflation and for preventing loss of air from the increase in air pressure in the tire as the air heats up.

Normally, tires are inflated to a safe operating pressure but the inflating equipment or air pump may have the capacity to overinflate the tire with air in an excessively high pressure. This can create a hazard for personnel in the area of the tire during inflation if the tire should burst but even a slight overpressure in the tire will result in abnormal wear of the tire. Incorrect pressure can also result in the vehicle not handling properly or riding as well and can increase fuel mileage.

Prior safety relief valves have been devised in which pressure relief devices were incorporated into the valve stem or the valve cap. Such devices have generally been expensive to manufacture and difficult to adjust and services. In addition, prior safety relief valves allow the escape of air when the tire is being overinflated. Such relief devices also have allowed the escape of air upon the tire heating up in on the road use to thereby increase the air pressure within the tire. This can leave the tire badly deflated when the vehicle stops or the air in the tire cools, which can also result in a dangerous situation and improper ride of the vehicle and improper steering and handling of the vehicle and loss of fuel mileage and rapid tire wear. Such prior safety relief valves have been incorporated either in the valve stem or the valve cap. Typical safety relief valves have included a spring loading valve connected from the valve stem or valve cap to the exterior of the valve and merely releases air when the pressure within the tire exceeds the level that the pressure relief valve is set for.

Typical prior art relief valves can be seen in the Wanstreet et al. U.S. Pat. No. 4,015,624, for a tire valve in which a valve assembly has a pair of flow passages including a tire inflation core and a relief valve portion, which valve is spring-biased to allow the escape of air when the air pressure opens the escape valve against the press spring. The Tuan et al. U.S. Pat. No. 5,054,511, is a tire valve having an automatic pressure release device which has a pair of spring loaded ball valves for allowing air to enter the tire and also to escape when the tire inflation equipment attempts to overinflate the tire. The pressure releasing portion of the device has an adjusting screw for the spring and ball valve to adjust the pressure release point. The Mitchell et al. U.S. Pat. No. 5,275,196, is a pressure relief valve for a tire rim which includes a valve body and a pair of chambers each having a ball valve therein to control the flow of air into the tire and to allow the escape of air when the tire is overinflated. The Sanchez U.S. Pat. No. 4,660,590, is an inflation pressure regulator which automatically releases air pressure above a predetermined maximum during inflation of a tire. The Wong U.S. Pat. No. 4,384,543, is a combined underinflation indicator and relief valve which has either a bellows spring or a coil spring driving a ball-like valve element against a valve seat. The Fleenor et al. U.S. Pat. No. 3,830,249, is a tire inflation device which permits inflation of a pneumatic tire at a controlled rate and discharges surplus air from the tire after a predetermined pressure has been reached. The Magnuson et al. U.S. Pat. No. 4,895,199, is a tire inflation and deflation valve which inflates or deflates tires to anyone of a plurality of pressures selected by the operator. The Perez U.S. Pat. No. 4,076,037, is a safety valve cap for an inflatable tire valve which has a compression spring loaded valve cap having a check valve which will release air to the atmosphere through the cap until the air pressure in the tire is slightly overbalanced by the compression spring. The Zhabokrug U.S. Pat. No. 5,060, 685, is a safety cap for tire valves which prevents the tire from exceeding the maximum allowable pressure. The Haus U.S. Pat. No. 2,987,071, is an air pressure control valve for attaching to a valve stem of a pneumatic tire to prevent abnormally high pressures in filling the tire with air. The Stevens et al. U.S. Pat. No. 4,151,863, is a deflation device which is pressure sensitive to a drop in the pressure of the emerging air to allow the valve to close when a predetermined low pressure remains in the tire.

In contrast to the prior art devices, the present tire pressure relief tire valve provides a simplified pressure relief for a tire valve incorporated into an existing tire valve stem which utilizes the existing valve core and which continuously adjusts for variations in the tire and air temperature to continuously vary the pressure required to open the deflating valve to prevent the valve from loosing excessive air when the car is running and heating up the tire and the air in the tire. Thus, the vehicle owner is prevented from overinflating the tires and, at the same time, will not have the tires underinflated once the tires have heated up. This results in prolonging the life of the tires as well as providing the best ride and handling for the driver of the vehicle. The vehicle tire can also be filled with air without danger of overinflating for a quick, safer maintenance of the tire.

SUMMARY OF THE INVENTION

A pressure relief tire valve for inflating a tire wheel assembly has a tire inflation valve body having a chamber therein with openings through the top and bottom ends thereof and having a relief opening formed in the tire valve body. An inflation valve having a spring loaded central core which allows air to pass into the tire is located in the tire valve body adjacent the tire inflation valve body top end for inflating the tire therethrough. An overpressure valve is located in the tire valve body for releasing air from the tire when the air pressure in the tire exceeds a predetermined level. The overpressure valve has a valve seat and valve element biased against the valve seat by a compression for maintaining the valve element in a closed position until a predetermined air pressure is reached in the tire and allows the valve element to open to release air through the valve body relief opening when the air pressure in the tire exceeds a predetermined pressure. A heat variable bellows supports the compression spring and is responsive to changes in temperature of the air in the tire so that the overpressure valve can prevent overinflating the tire as well as loss of tire pressure upon an increase of air pressure in the tire from an increase in temperature of the air in the tire.

BRIEF DESCRIPTION OF THE DRAWINGS

Other objects, features, and advantages of the present invention will be apparent from the written description and the drawings in which:

FIG. 1 is a sectional view taken through a tire valve incorporating the pressure relief valve of the present invention in an open position;

FIG. 2 is a sectional view taken of the pressure relief tire valve of FIG. 1 in which the overpressure valve is closed; and FIG. 3 is a sectional view taken through the line 3—3 of FIG. 1.

DESCRIPTION OF THE PREFERRED EMBODIMENT

Referring to FIGS. 1–3 of the drawings, a pressure relief tire valve 10 has a tire valve body 11 which may be a rubber outer body extending over an inner body 12 which may be made of metal, such as brass or injection molded plastic, such as nylon. The metal body 12 has an internal chamber 13 and an open top end 14 and an open bottom end 15. The open top end faces the atmosphere while the open end 15 is within the wheel 16 passing through the tire valve opening 17 and is open to the inside the tire mounted on the wheel. The metal body 12 has an external threaded top portion 18 for accepting a tire valve cap and has a central core 20 that is threadedly mounted therein in the threads 21. The central core 21 is spring loaded to allow air to pass inward only when the pin 22 is pushed in by the inflation nozzle but when the pin 22 is released, the spring closes the valve and prevents the escape of air from the chamber 13. The chamber 13 is open to the inside of the tire 22 through a plurality of passageways 23.

An overpressure valve 24 is mounted within the metal body 12 of the tire valve 10 against a ledge 25. The overpressure valve 24 has a housing 26 having a relief opening 27 therethrough and aligning with a relief opening 28 in the tire valve body 11 and 12. A valve seat 30 is threadedly mounted in the internal threads 31 in the valve housing 24 and has an 0-ring seal 22 therein. A ball valve element 33 is located in the chamber 34 in the housing 26 and is biased with a compression spring 35 to seat in the valve seat 30 to maintain the pressure relief valve 24 closed unless a predetermined pressure builds up in the tire and in the chamber 13 sufficient to drive the ball valve element 33 against the compression spring 35 when the pressure in the tire exceeds a predetermined set pressure limit. The air then passes through the opening 36 in the valve seat 30 and into the chamber 34 and out the relief openings 27 and 28 to the atmosphere. When the tire deflates to a point, the pressure drops and allows the compression spring 35 to drive the valve element 33 against a valve seat 30. The valve is again closed.

Thus, when filling the tire valve 10, when the inflating pressure exceeds a certain predetermined point, the tire will not exceed the set pressure limit because of the relief valve 24 having the pressure opening the valve element 33 and allowing air to escape. However, once the vehicle is driven, especially over hot roads and in warmer climates, the tire and air in the tire tend to heat up from the ambient temperature and the friction of the tire on the road. Since the heated air tends to expand, it increases the pressure within the tire (air pressure increases about 1 psi per 10 degrees in temperature increase) which then opens the valve 24 to allow air to escape to bring the air pressure down to the set inflation pressure. This would leave the tire underinflated when the tire cools down.

A heat varying bellows 37 is a sealed bellows with a gas, such as air or nitrogen therein, which is sized and pressurized to support the compression or coil spring 35 on one end thereof within the housing 26. When the bellows 37 is heated from the heating up of the air within the tire, as well as the heating of the wheel and tire, it will expand and further compress the compression spring 35 to increase the pressure required to move the ball valve into an open position. When the bellows cool, it will then contract so that the opening pressure is constantly varied by varying the compression of the spring 35 to constantly vary the amount of pressure that it takes to open the overpressure valve 24 by the pressure against the ball element 33. This prevents the tire from deflating by an increase in pressure by the tire heating up and heating the air in the tire to expand the air to increase the pressure within the tire. When the tire cools, the pressure will still be set at the correct pressure setting.

The valve element 30 has an allen wrench opening 38 in the top thereof, as seen in FIG. 3. This allows the valve seat 30 to be threaded in and out on the threads 31 to vary the length of the coil spring 35 by further compressing or expanding the coil spring 35 with the ball valve element 33 seated in the valve seat. This is accomplished by removing the center core 20, inserting an elongated allen wrench into the hex insert 38 and rotating the allen wrench to adjust the pressure setting for the tire valve and tire.

It should be clear at this time that a pressure relief tire valve has been provided which prevents the overinflation of a balloon tire and at the same tire prevents the release of air whenever the tire is heated during operation of a vehicle. However, the present invention should not be considered limited to the forms shown which are to be considered illustrative rather than restrictive.

I claim:

1. A pressure relief tire valve comprising:
   a tire valve body having a chamber therein and having an opening through top and bottom ends thereof and having a relief opening formed through said tire valve body;
   an inflation valve located in said tire valve body adjacent said top end opening for inflating a tire therethrough;
   an overpressure valve located in said tire valve body for releasing air from said tire when the air pressure in said tire exceeds a predetermined level, said overpressure valve having a valve seat and a valve element biased against said valve seat, said overpressure valve having biasing means for maintaining said valve element in a closed position until a predetermined air pressure is reached in said tire and to allow said valve element to open to release air through said valve body relief opening when the air pressure in said tire exceeds said predetermined pressure, said biasing means including a heat variable biasing element for varying the opening pressure of said overpressure valve responsive to changes in the temperature of said heat variable biasing element whereby said overpressure valve prevents overinflating said tire and loss of tire pressure upon an increase of air pressure in said tire from an increase in temperature of the air in said tire.

2. A pressure relief tire valve for use on a tire in accordance with claim 1 in which said biasing means includes a compression spring.

3. A pressure relief tire valve for use on a tire in accordance with claim 2 in which said biasing means includes a heat variable bellows supporting said compression spring.

4. A pressure relief tire valve for use on a tire in accordance with claim 3 in which said air overpressure valve has a valve casing.

5. A pressure relief tire valve for use on a tire in accordance with claim 4 in which said overpressure valve casing has a relief hole therein aligned with said valve body relief opening.

6. A pressure relief tire valve for use on a tire in accordance with claim 5 in which said valve seat is adjustable against said valve element and compression spring to change the pressure required to open said relief valve.

7. A pressure relief tire valve for use on a tire in accordance with claim 6 in which said bellows is filled with a gas.

8. A pressure relief tire valve for use on a tire in accordance with claim 7 in which said bellows gas is air.

9. A pressure relief inflation valve for use on a tire in accordance with claim 8 in which said valve element has an allen wrench head for adjusting the position of said valve element against said valve member to thereby change the compression of said compression spring.

10. A pressure relief tire valve for use on a tire in accordance with claim 9 in which said valve body has at least one passageway around said overpressure valve casing to allow the filling of said tire with air.

11. A pressure relief tire valve for use on a tire in accordance with claim 10 in which said valve body attaches through a wheel rim.

12. A pressure relief tire valve for use on a tire in accordance with claim 11 in which said valve body has a plurality of passageways around said overpressure valve casing.

13. A pressure relief tire valve for use on a tire comprising:

a tire valve body having a chamber therein and having an opening through top and bottom ends thereof and having a relief opening formed through the side of said tire valve body;

an inflation valve located in said tire valve body adjacent said tire valve body top end for inflating a tire therethrough;

an overpressure valve located in said tire valve body for releasing air from said tire when the air pressure in said tire exceeds a predetermined level, said overpressure valve having a valve seat and a compression spring biased valve element for maintaining said valve element in a closed position until a predetermined air pressure is reached in said tire and to allow said valve element to open to release air through said valve body relief opening when the air pressure in said tire exceeds said predetermined pressure, said overpressure valve having a heat variable bellows supporting said compression spring for varying the compression of said spring and thereby the opening pressure of said overpressure valve responsive to changes in the temperature of said heat variable bellows whereby said overpressure valve prevents overinflating a tire and loss of tire pressure upon an increase of air pressure in said tire from an increase in temperature of the air in said tire.

* * * * *